May 17, 1955　　　　F. D. MATRAS　　　　2,708,538
FISH STRINGERS
Filed July 11, 1949

INVENTOR
FRANK D. MATRAS
BY Wheeler, Wheeler & Wheeler
ATTORNEYS

United States Patent Office 2,708,538
Patented May 17, 1955

2,708,538

FISH STRINGERS

Frank D. Matras, Milwaukee, Wis., assignor to Frabill Manufacturing Company, Milwaukee, Wis., a corporation of Wisconsin Application July 11, 1949, Serial No. 104,008

2 Claims. (Cl. 224—7)

My invention relates to improvement in fish stringers.

Every fisherman is acquainted with the troublesome problems related to stringing of fish which have been caught. Probably the more common method involves the lacing of a stout line or chain through the fish gills and the fish mouth, with one fish after another laced upon a single line or chain. This results in crowding of one fish head against another with an excessive pressure upon fish first to have been strung on the line or chain.

The object of my invention, therefore, is to provide means for stringing fish sufficiently individually and sufficiently separately positioned upon a "string" so that one fish does not crowd another and the weight of each fish is individually supported by my stringer.

Another object of my invention is to provide a method of manufacturing my individual "spacer-carriers" which form an important part of the mechanical assembly comprising my fish stringer.

In the drawings:

Figure 4 is a perspective of a plate of raw material perforated to carry out the first step of my method of manufacture of a spacer carrier.

Figure 5 is a view similar to Figure 4, but showing a first forming operation upon the plate shown in Figure 4.

Figure 6 shows a third step in my method for forming the tubular portion of my spacer-carrier.

Figure 7 is a section on line 7—7 of Section 5.

Figure 8 is a section on line 8—8 of Figure 5.

Figure 9 is a perspective of the completed tubular portion of my spacer-carrier.

Figure 10 is a fragmentary showing of a side elevation of my spacer-carrier.

Figure 11 is a section on line 11—11 of Figure 10.

Like parts are designated by the same reference characters throughout the several views.

Figure 1:
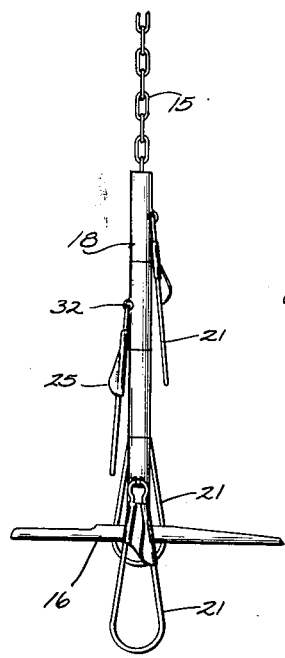
Figure 1 is an elevation of my fish stringer assembly.
Figure 2:
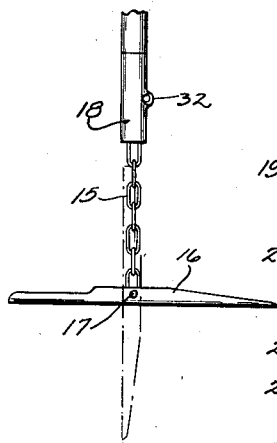
Figure 2 is a detail of the terminal element of my fish stringer and a fragmentary portion of one of my spacer-carriers, dotted lines being used to show adjustment of my terminal element.

My stringer 15 is shown as a link chain, but it will be understood that a stout line of cordage or flexible wire may be substituted, within dimensional limits which will be clear from the following description and as shown in Figures 1 and 2. The terminal element of stringer 15 is a keeper 16, which I prefer to form in partially mutilated tubular configuration at one end, so that it may receive the stringer 15 when the terminal is aligned with the stringer. At 17 the stringer is secured to a cross pin about which the terminal element or keeper 16 may be swung from the position shown in dotted lines in Figure 2, to the position shown in full lines in Figure 1, where it may act as a keeper to prevent release of spacer-carriers hereinafter to be described.

Figure 3:
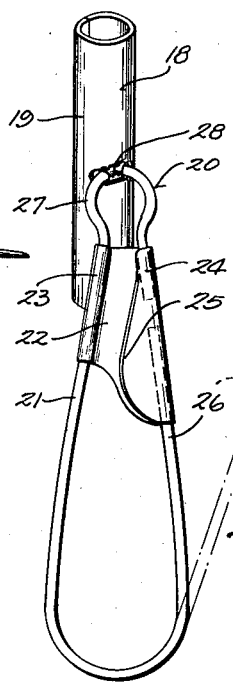
Figure 3 is an enlarged elevation of one of my spacer-carriers and a clip for attaching a fish thereto.
Figure 4:
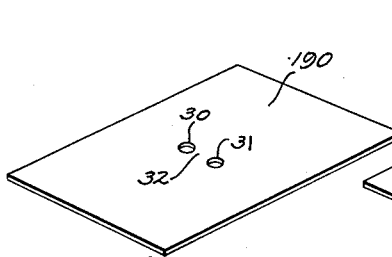
Figures 4 to 11 show my method steps and details of my spacer carrier, as follows.

Each fish to be "strung" upon my fish stringer is carried by an individual spacer-carrier 18, which includes a tubular member 19 and a clip 20 extending therefrom. Clip 20 is a common safety pinlike member, which will be recognized by any fisherman in this art. It is usually made of wire 21, shaped as most clearly shown in Figure 3, and provided with an apronlike shield 22, rolled tightly about wire 21 at 23 and at 24, but provided with an outstanding guide plate 25, into which the releasable portion 26 of the spring wire may be inserted in a manner well known. A smaller loop 27 of clip 20 is loosely receivable behind the protuberance 28 on the tubular spacer-carrier 18 and the spacer-carrier to receive each fish is used as now to be described.

As each fish is caught, it is clipped into the clip 20 upon the portion 26 and the wire 21. Tubular portion 19 of the spacer-carrier is then "laced" upon the terminal element or keeper 16 which, during this operation is aligned with the stringer, as shown in Figure 2. After the spacer-carrier 18 had been slidably thrust to a position on the stringer 15, so that the terminal element may be moved to the position shown in Figure 1, the tubular spacer may slide down upon the stringer 15 against the terminal element 16 which will then act as a keeper and prevent actual removal of the fish and spacer from the stringer. As each successive fish is caught and impaled upon the wire 21—26 of another spacer carrier, the preceding spacer-carrier upon the stringer will be thrust further up the stringer and the new spacer-carrier takes its position against the terminal element 16.

Thus tubular spacers 18, against other tubular spacers, sustain the weight of the respective fish ultimately carried by the stringer 15 and the terminal element 16, each fish being individually supported by its spacer-carrier.

It will be noted that the ends of the tubes 19 are of sufficient weight supporting area to carry the loads inflicted upon them and it will be noted that even though the tubes are of sufficient internal diameter to pass the terminal element 16, there is not so much free space between the stringer 15 and the inside walls of the tubes 19 as to permit serious misalignment of the tubes with respect to one another.

When the fish are to be removed from the stringer, the various spacer carriers are thrust away from the terminal element 16 sufficiently to permit of its oscillation around pin 17 into alignment with stringer 15, whereupon all of the spacer elements may be slidably removed over the terminal element.

Figure 5:
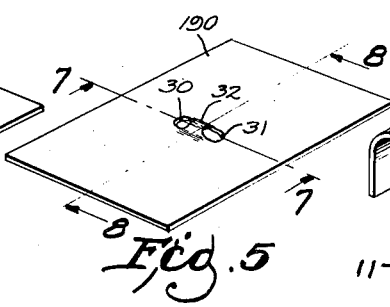
Figure 6:
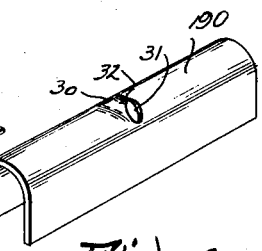
Figure 7:
Figure 8:
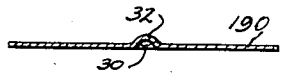

My method of making spacer carriers is shown in Figures 4 to 11. Ductile material 190 in plate form is initially apertured at 30 and 31 to provide an intervening web 32. By ductile I mean that plate 190 is preferably made of brass or copper, or relatively light sheet steel or other material, so that it may be formed cold. The second step, as shown at Figure 5, includes the swelling of the web 32 by any process well known for forming ductile material. The web is formed so that it is tunnel shaped, with the apertures 30 and 31 providing the openings at either end of the tunnel. The third step in my method of forming spacer carriers is the rolling of plate 190 into U shape, as shown in Figure 6, with the formed web 32 comprising a protuberance on the outside of the U.

Figure 9:
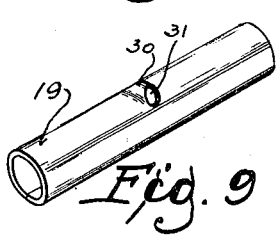
Figures 10, 11:
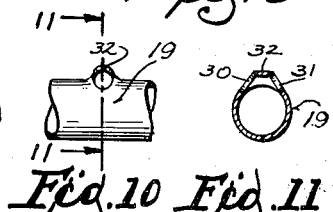

The last step in my method is the completion of the tubular shape 19 of the material 190, as shown in Figure 9. In this process the protuberance formed by the web 32 takes its shape, as shown clearly in Figures 9, 10 and 11, where it is to be seen that the smaller loop of wire 27 of the clip 20 may be received through the apertures 30 and 31 with the wire loop 27 disposed tangentially to the inner surface of the tube 19, in position not to interfere with the passage of terminal element 16 or the stringer 15 itself.

From the above description it will be seen that my stringers and my spacer-carriers comprise a flexible and extremely adaptable equipment for the purpose intended. The stringer 15, with its terminal element 16 may be kept separately in a tackle box and my spacer-carriers with their respective clips 20, may be stowed separately if desired. Alternatively the entire complement of spacer carriers may be laced upon the stringer 15 and kept as a handy assembled "unit."

I claim:

1. The method of forming a tubular member having a passageway tangential to the passageway through the tube and transversely offset therefrom, said method comprising the steps of forming spaced apertures through a plate of ductile material intermediate the margins of the plate, forming the web of material between the apertures outwardly into an elongated channel extending from one aperture to the other and for which the apertures provide end openings, and forming the plate about an axis transverse respecting the channel into a cylinder in which opposite margins of the plate substantially abut one another and the channel is transversely disposed on the outside of the cylinder and opens to the interior thereof the holes in the plate at the ends of the channel facilitating the arcuate bending of the plate upon an axis transverse to the channel notwithstanding the stiffening effect of the channel.

2. For mounting on a flexible line element, an elongated split tube having substantially meeting margins and a wall portion provided intermediate said margins with apertures spaced peripherally of the tube and with an outwardly protuberant channel extending from one aperture to the other transversely respecting the tube, together with a fish-retaining clip having detachably engaged fish retaining ends and a bight portion in connection with the tube and extending through the channel and the apertures and pivoted in the channel on an axis transverse to the tube.

References Cited in the file of this patent
UNITED STATES PATENTS

| | | |
|---|---|---|
| 383,135 | Mansfield | May 22, 1888 |
| 928,427 | Coleman | July 20, 1909 |
| 1,026,340 | Brakenridge | May 14, 1912 |
| 1,228,766 | Field | June 5, 1917 |
| 1,350,390 | Stein | Aug. 24, 1920 |
| 1,417,759 | McNiece | May 30, 1922 |
| 1,639,648 | Carrey | Aug. 23, 1927 |
| 1,680,032 | Anderson | Aug. 7, 1928 |
| 1,707,668 | Manson | Apr. 2, 1929 |
| 2,004,247 | McCaul | July 11, 1935 |
| 2,062,386 | Withey | Dec. 1, 1936 |
| 2,112,339 | Kasparek | Mar. 29, 1938 |
| 2,210,993 | Weatherhead | Aug. 13, 1940 |
| 2,226,402 | Hirschmann | Dec. 24, 1940 |
| 2,297,623 | Hickman | Sept. 29, 1942 |
| 2,305,375 | Beasley | Dec. 15, 1942 |
| 2,401,542 | Booth | June 4, 1946 |
| 2,517,761 | Boyer | Aug. 8, 1950 |